United States Patent
Nixon et al.

(10) Patent No.: US 6,806,847 B2
(45) Date of Patent: Oct. 19, 2004

(54) PORTABLE COMPUTER IN A PROCESS CONTROL ENVIRONMENT

(75) Inventors: Mark J. Nixon, Round Rock, TX (US); Vasiliki Tzovla, Evia (GR); Andrew P. Dove, Austin, TX (US); Kent A. Burr, Round Rock, TX (US); Neil J. Peterson, Austin, TX (US)

(73) Assignee: Fisher-Rosemount Systems Inc., Austin, TX (US)

( * ) Notice: Subject to any disclaimer, the term of this patent is extended or adjusted under 35 U.S.C. 154(b) by 0 days.

(21) Appl. No.: 09/951,715

(22) Filed: Sep. 13, 2001

(65) Prior Publication Data
US 2002/0130846 A1 Sep. 19, 2002

Related U.S. Application Data

(63) Continuation-in-part of application No. 09/249,597, filed on Feb. 12, 1999.

(51) Int. Cl.[7] ............................................. G09G 5/00
(52) U.S. Cl. ........................... 345/2.1; 345/7; 709/217
(58) Field of Search ........................... 345/1.1, 1.2, 1.3, 345/2.1, 2.2, 3.1, 3.2, 3.3, 3.4, 7, 8, 168, 169; 709/250, 200, 204, 217, 218, 219, 224; 348/115

(56) References Cited

U.S. PATENT DOCUMENTS

| | | | | |
|---|---|---|---|---|
| 5,320,538 A | * | 6/1994 | Baum ..................... 434/307 R |
| 5,815,126 A | * | 9/1998 | Fan et al. ...................... 345/8 |
| 5,838,595 A | | 11/1998 | Sullivan et al. |
| 5,844,824 A | * | 12/1998 | Newman et al. ............. 345/156 |
| 6,085,135 A | | 7/2000 | Steckel ........................ 701/50 |
| 6,172,657 B1 | * | 1/2001 | Kamakura et al. ............. 345/8 |
| 6,266,612 B1 | | 7/2001 | Dussell et al. .............. 701/207 |
| 6,457,024 B1 | * | 9/2002 | Felsentein et al. ............. 345/8 |
| 6,574,672 B1 | * | 6/2003 | Mitchell et al. ............ 709/250 |
| 2002/0114525 A1 | * | 8/2002 | Bolle et al. ................. 382/232 |

FOREIGN PATENT DOCUMENTS

| EP | 0 670 537 A1 | 9/1995 |
|---|---|---|
| GB | 2 346 720 A | 8/2000 |

* cited by examiner

*Primary Examiner*—Xiao Wu
(74) *Attorney, Agent, or Firm*—Marshall, Gerstein & Borun LLP

(57) ABSTRACT

A portable computer for use in interfacing to a process control system having a host system includes a housing adapted for hand-held operation, a processing unit disposed within the housing and a computer readable memory disposed within the housing and coupled to the processing unit. The portable computer also includes a display, a keypad and a radio frequency transceiver adapted to communicate with the host system, all of which are disposed within the housing and communicatively coupled to the processing unit. A first software routine stored in the computer readable memory processes a user input received from the keypad and sends a command to the host system via the radio frequency transceiver. Additionally, a second software routine stored in the computer readable memory receives process information sent from the host system in response to the command and displays the received process information via the portable computer display.

35 Claims, 8 Drawing Sheets

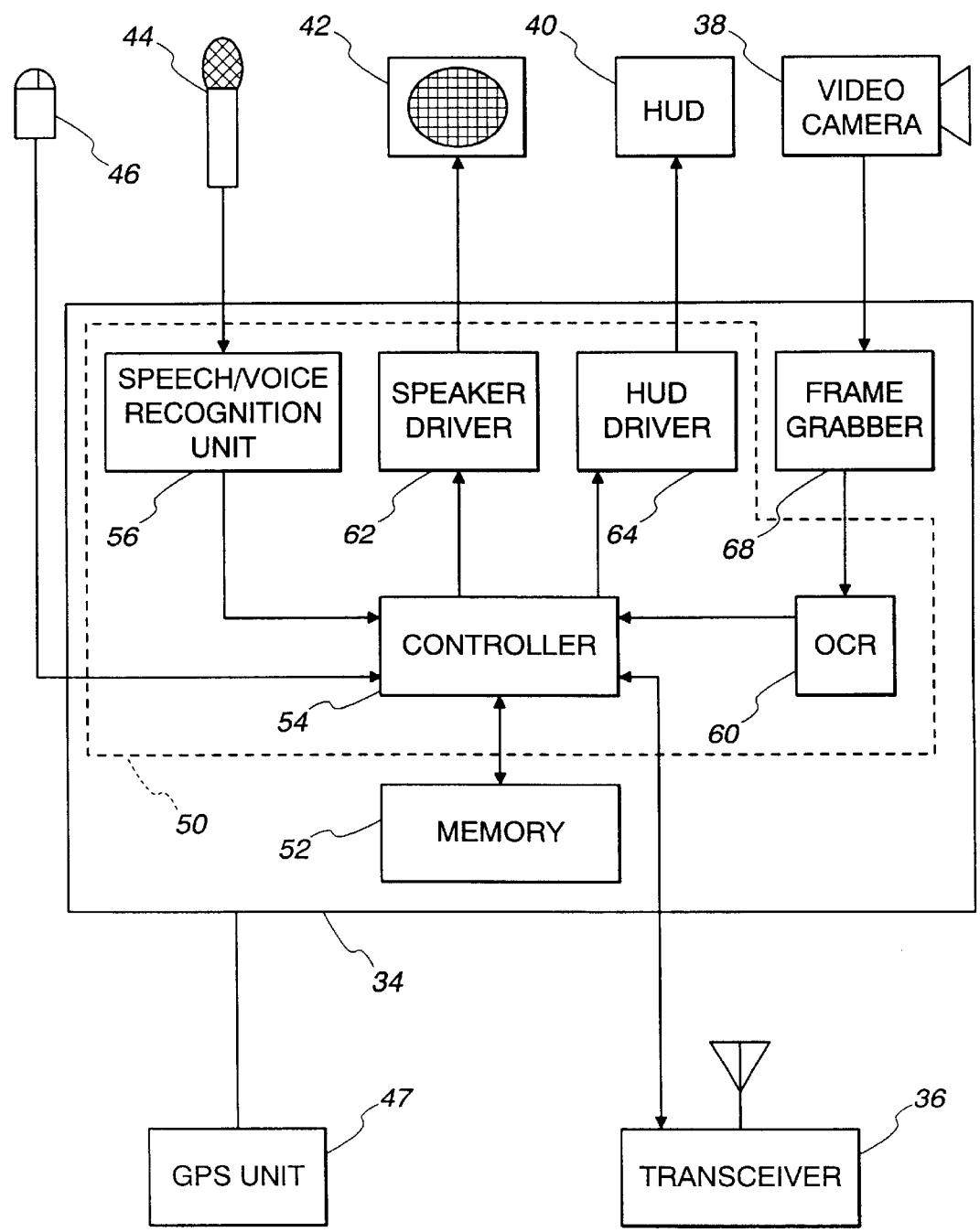

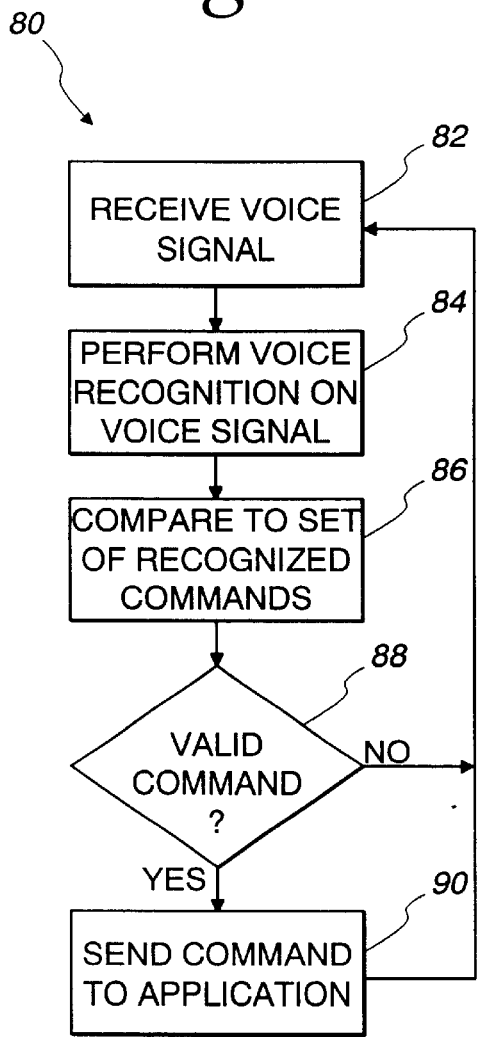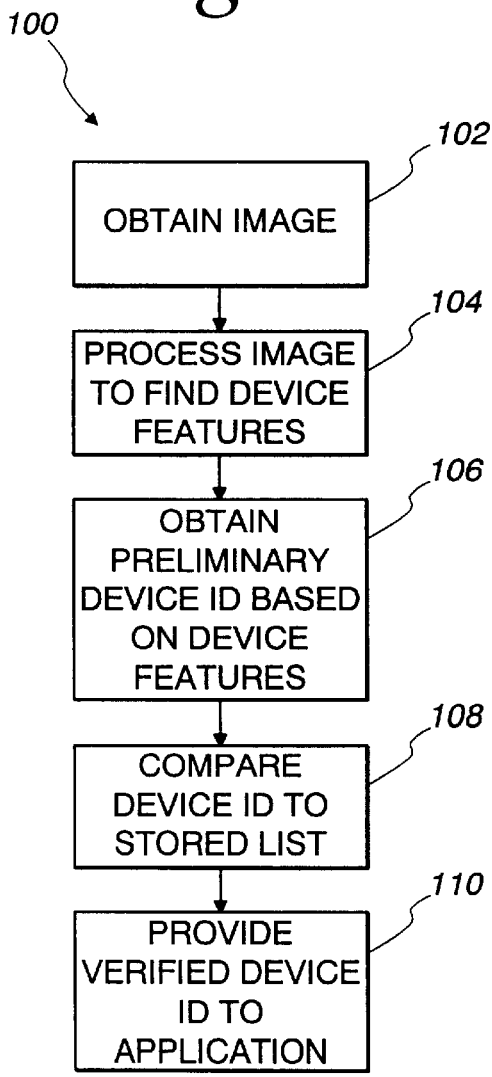

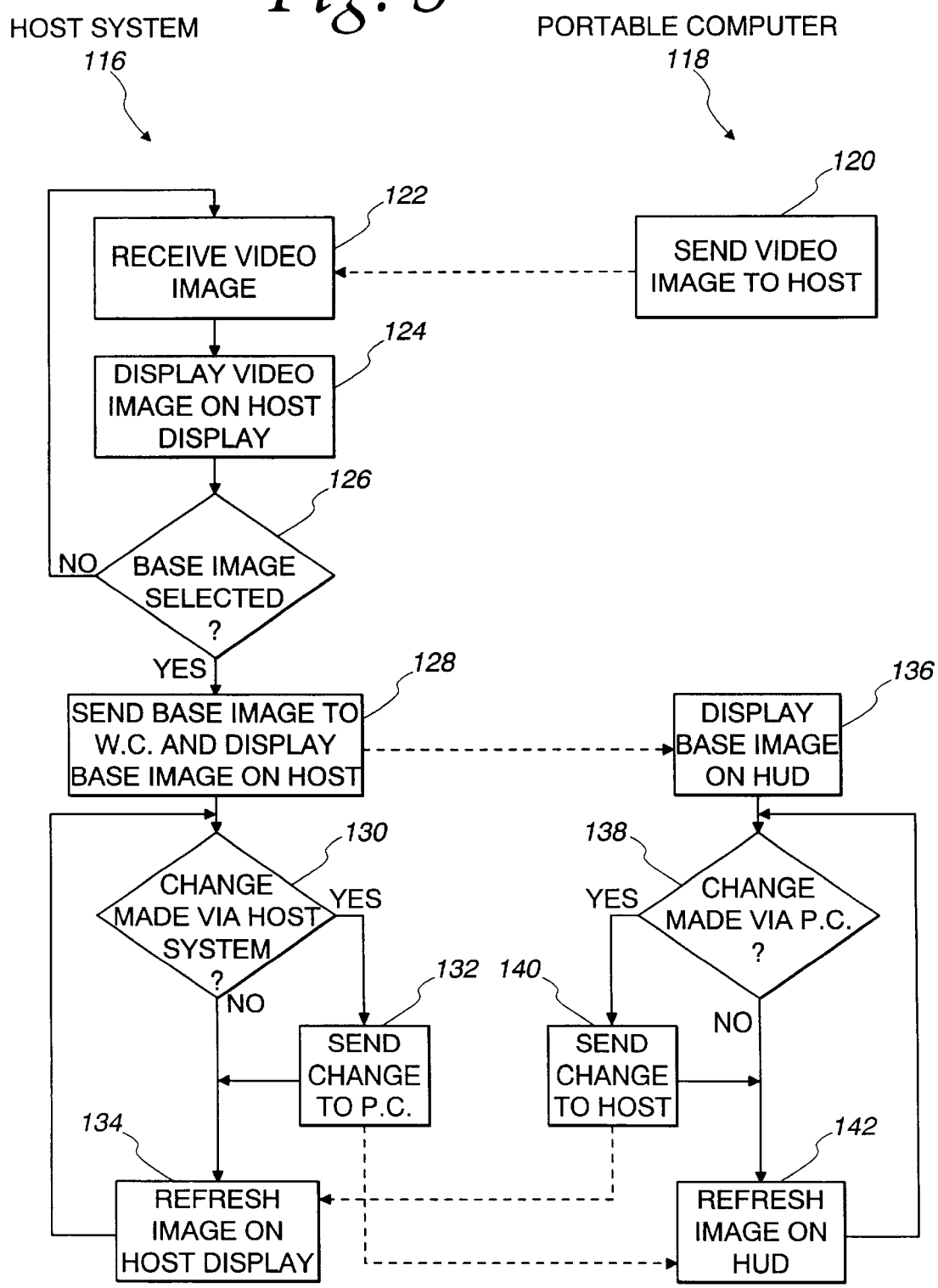

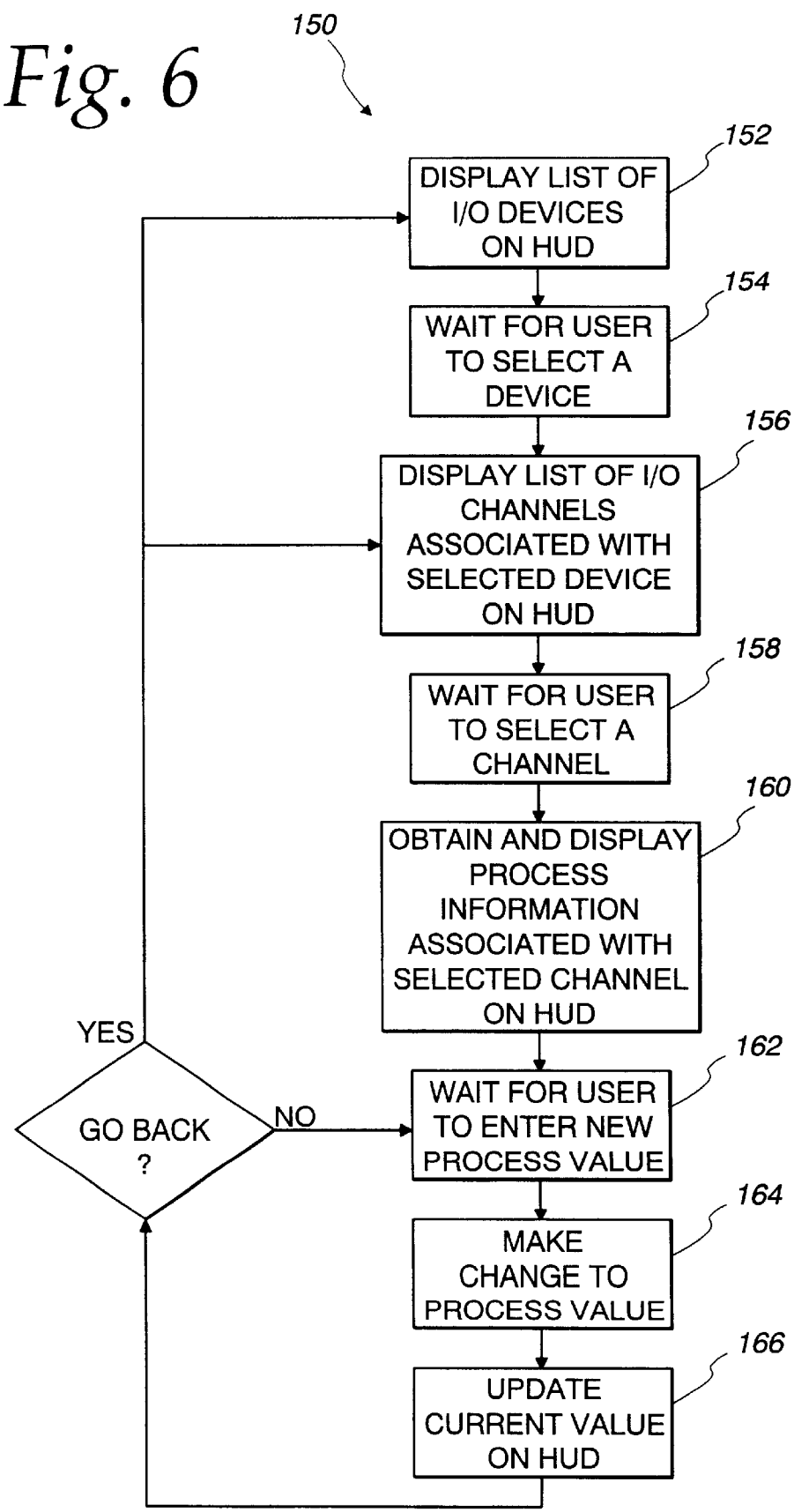

PORTABLE COMPUTER IN A PROCESS CONTROL ENVIRONMENT

RELATED APPLICATION

This application is a continuation-in-part of U.S. Ser. No. 09/249,597 entitled "Wearable Computer in a Process Control System," which was filed on Feb. 12, 1999.

FIELD OF THE INVENTION

The present invention relates generally to process control systems and, more particularly, to the use of a portable computer to provide enhanced support within a process control environment.

DESCRIPTION OF THE RELATED ART

Process control systems, like those used in chemical, petroleum or other processes, generally include a centralized process controller that is communicatively coupled to at least one host or operator workstation and to one or more field devices via analog, digital or combined analog/digital buses. The field devices, which may be, for example valves, valve positioners, switches, sensors (e.g., temperature, pressure and flow rate sensors), etc., perform control functions within the process such as opening or closing valves and taking measurements of process parameters. Generally speaking, the process controller receives signals indicative of process measurements made by the field devices and/or other information pertaining to the field devices, uses this information to implement a control routine and then generates control signals which are sent over the buses to the field devices to control the operation of the process. Information from the field devices and the controller is typically made available to one or more applications that are executed by the operator workstation to enable an operator to perform any desired function with respect to the process, such as viewing the current state of the process, modifying the operation of the process, performing diagnostic activities, optimizing the process, managing process alerts or alarms, carrying out batch activities, etc.

While an operator or a technician can access a variety of types of information pertaining to the process control system and the individual devices therein (such as help, diagnostic, set-up and configuration information) using the host or operator workstation, there are many process control activities that require a technician to go out into the actual plant environment where no host or operator workstation is present. Such activities include, for example, visually inspecting a process control device or area, connecting devices or buses within the process control environment, taking manual measurements, troubleshooting, repairing and replacing field devices, etc. In these cases, the operator or technician may carry manuals pertaining to the function to be performed out into the plant and look up any needed information in the field. This process can be very cumbersome. More likely, the technician will return to the operator workstation one or more times to look up any information he or she may need during the course of the performing the desired activity, which is very time consuming and prone to error. Other times, the technician will carry a radio or walkie-talkie into the plant and communicate via the radio with an operator located at the operator workstation to get any needed information. However, the amount of information that can be provided over the radio is limited and is prone to errors because it is based on human communications. Furthermore, because the technician typically carries and operates the radio using his or her hands, the use of a radio makes performing certain functions, like repairing a device, much more cumbersome and difficult.

With the advent of smaller electronics, portable computers in the form of wearable and/or hand-held computers have become more readily available. A wearable and/or hand-held computer generally includes a standard central processing unit (CPU) and a memory packaged in a small container that may be placed within a pouch on a belt or harness worn by a user (also referred to herein as a "wearer") which is designed to make carrying the wearable computer as convenient as possible. In some cases, a hand-held computer such as, for example, a personal data assistant (PDA) may be hand carried, holstered in a belt or pouch, or otherwise worn by a user as needed or desired. By way of example, a user may holster (i.e., wear) a PDA while in transit to a particular location within a process plant and, upon arriving at that location, may remove the PDA from the holster and begin to use the PDA as a hand-held computer. Batteries for powering a wearable and/or hand-held computer may be located in a different pouch within a harness or within an integral compartment of the computer housing. Peripheral devices, such as disk drives, hard drives, PCMCIA slots, microphones, bar code readers and keyboard devices may be communicatively coupled to the CPU via appropriate wires or buses and, if desired, one or more of these peripheral devices may be placed in or connected to the harness. Alternatively or additionally, one or more of these peripheral devices may be integrated within the portable computer (i.e., a hand-held and/or wearable computer), if desired. It has also been suggested to provide a heads up display (HUD) worn by the wearable computer user to present the user or wearer with a visual interface. A wearable computer thereby provides portable computing power and memory to a user and, because a wearable computer is worn instead of carried by the user, the user's hands are only required to manipulate a keyboard or other input device. Of course, a hand-held computer such as, for example, a PDA may be conveniently carried to a location within a plant within a user worn pouch or the like, or may be carried by hand, if desired. A user may then holster the hand-held computer or set it down using its integral stand, if one is provided, to permit the use of both hands.

While it has been previously suggested to use portable computers in environments such as office environments, it is not believed that neither a wearable computer nor a hand-held computer such as, for example, a PDA, has been incorporated in and used in a process control system to enhance the abilities of an operator or a technician to identify devices and to perform other functions within a process control environment. Also, most portable computers require the use of some sort of hand-manipulated input device, such as a keyboard or a twiddler. While these devices are typically ergonomically designed to be as least cumbersome as possible, these devices still require the use of a the wearer's hands to input information or data. In a process control environment however, a technician typically needs to have both hands free in order to perform complex operations, such as calibrating and repairing devices, connecting devices within the process control system, etc.

SUMMARY OF THE INVENTION

A portable computer for use in a process environment having a process control system therein may include a housing adapted for portable operation, a processing unit disposed within the housing, a computer readable memory disposed within the housing and coupled to the processing unit and a display disposed within the housing and coupled to the processing unit. Additionally, the portable computer may include an input device that provides an input signal to the processing unit and a software routine that processes the input signal and provides information pertaining to the process control system via the display.

Alternatively or additionally, a portable computer for use in a process control system having a host system may include a housing adapted for hand-held operation, a processing unit disposed within the housing and a computer readable memory disposed within the housing and coupled to the processing unit. In addition, the portable computer may include a display disposed within the housing and coupled to the processing unit, a keypad disposed within the housing and coupled to the processing unit and a radio frequency transceiver disposed within the housing and coupled to the processing unit. The radio frequency transceiver may be adapted to communicate with the host system. The portable computer may also include a first software routine that processes a user input received from the keypad and sends a command to the host system via the radio frequency transceiver. Additionally, a second software routine may receive process information sent from the host system in response to the command via the radio frequency transceiver and display the received process information via the display.

Alternatively or additionally, a hand-held computer for interfacing with a process control system includes a housing adapted for hand-held operation, a processor disposed within the housing and a computer readable memory disposed within the housing and coupled to the processor. The hand-held computer may further include an electronic display disposed within the housing and coupled to the processor, a keypad disposed within the housing and coupled to the processing unit and a transceiver disposed within the housing and communicatively coupled to the processing unit. The transceiver may be adapted to communicate with a remotely situated processor and the hand-held computer may include a software routine that enables a user to interface with the process control system.

BRIEF DESCRIPTION OF THE DRAWINGS

FIG. 2 is a schematic block diagram of the portable computer system of FIG. 1;

FIG. 3 is a flow chart diagram of a software routine that processes voice data to recognize commands in the portable computer system of FIG. 2;

FIG. 4 is a flow chart diagram of a software routine that automatically recognizes process control devices based on video information collected by the portable computer system of FIG. 2;

FIG. 5 is a flow chart diagram of a set of software routines that provide a shared image between a host system and the portable computer system of FIG. 2;

FIG. 6 is a flow chart diagram of a software routine that provides support to a portable computer user who is verifying communication connections within a process control environment;

DESCRIPTION OF THE PREFERRED EMBODIMENTS

Figure 1:
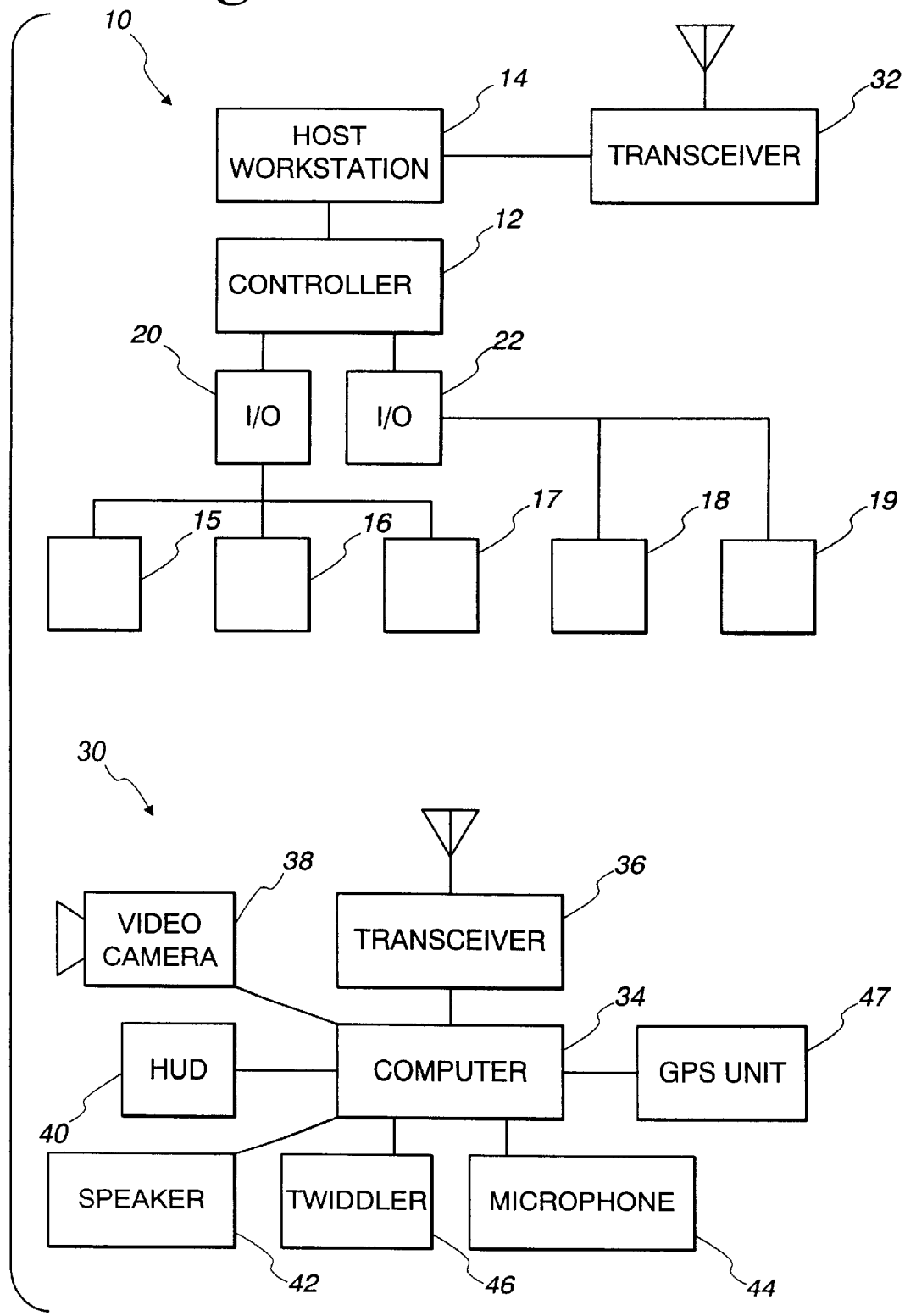
FIG. 1 is a schematic block diagram of a process control network having a portable computer system remotely coupled thereto.

Referring now to FIG. 1, a process control system 10 includes a process controller 12 connected to a host workstation or computer 14 (which may be any type of personal computer or workstation) and to field devices 15, 16, 17, 18 and 19 via input/output (I/O) cards 20 and 22. The controller 12, which can be by way of example, the DeltaV™ controller sold by Fisher-Rosemount Systems, Inc., may be communicatively connected to the host computer 14 via, for example, an ethernet connection and may be communicatively connected to the field devices 15–19 using hardware and software associated with any desired communication protocol, such as, for example, the FOUNDATION™ Fieldbus, the HART®, PROFIBUS®, WORLDFIP®, Device-Net® or CAN protocols. As is typical, the controller 12 implements a process control routine stored therein and communicates with the devices 15–22 and the host computer 14 to control a process in any desired manner. The field devices 15–19 may be any types of devices, such as sensors, valves, transmitters, positioners, etc., while the I/O cards 20 and 22 may be any types of I/O devices conforming to any desired communication or controller protocol.

As illustrated in FIG. 1, the host computer 14 is communicatively coupled to a portable computer system 30 through a remote or wireless communication device, such as a remote ethernet transceiver 32. Alternatively or additionally, the host computer 14 may be coupled to the portable computer system 30 via a physical line or bus having terminals located throughout the process control environment to which the portable computer system 30 can be temporarily connected and disconnected.

The portable computer system 30 may include a wearable and/or hand-held computer 34 having a remote transceiver 36 and a number of peripheral devices coupled thereto. Preferably, but not necessarily, the wearable and/or hand-held computer 34 includes a Pentium class CPU mother board with video, sound, RAM (e.g., 64 Mb) and ROM with a hard drive (e.g., 4.3 Gb), all of which may be located within a wearable computer harness (not shown). Alternatively or additionally, some or all of the peripheral devices may be integrated within a housing of the computer 34. The computer 34 may include any number of communication ports or slots, such as PCMCIA slots, one of which can be used to receive the remote transceiver 36 and another of which may be used to receive a video processing board such as a video frame capture board. The peripherals communicatively coupled to the computer 34 may include an imaging device 38, which may be a video camera, a HUD 40, a speaker 42, which may be a headphone speaker or any other type of speaker, a microphone 44 and a user input device 46 that may be for example, a typical keyboard, a mouse, a track ball, or a twiddler device having a limited number of easy to use keys (such as function keys), the function of which may be defined differently for different applications. The portable computer system 30 may also include a global positioning system unit 47 which, as described further below, may enable the portable computer system 30 to inform the user and/or the host workstation 14 of the user's current location within process control plant. Of course, any other peripheral devices may be used instead of or in addition to those specifically described herein.

While the imaging device 38 is preferably a video camera, it may instead be any other type of imaging device, such as a digital camera, that is compact and easily transported by the wearer in a hands-free manner. Preferably, but not necessarily, the video camera 38 or other imaging device is mounted on the HUD 40 or on some other device (such as wearable headgear) that causes the field of view of the video camera 38 to point in the direction that the user is looking. One video camera that may be used for this purpose is sold by the Pulnix corporation. The Pulnix video camera conforms to the high definition television (HDTV) standard (i.e., produces an 800 by 600 color pixel image frame), has about one-quarter of an inch to one-half of an inch diameter lens and produces a high resolution color image. However, other video cameras can be used instead including, for example, video cameras that produce high or low definition color or black and white (i.e., gray-scale) images. In some instances, a low definition video camera (either color or black and white) may be preferable to speed up the time needed to process an image in the manner described below.

The HUD 40 may use an NTSC video format and is preferably a monocular HUD such as the M1 HUD sold by Liquide Image Corp. located in Canada. This HUD provides a quarter VGA (i.e., 320 by 240 pixel) gray-scale image. Of course, HDTV format HUDs (which are currently prohibitively expensive) or other color or gray-scale HUDs, either those available now or those developed in the future, could be used instead. The speaker 42, the microphone 44 and the input device 46 can be any suitable and easily transportable devices and are preferably mounted with respect to the wearer or user or are integrated within the computer 34 to facilitate hands-free activities. In one embodiment, a bone microphone may operate as both the microphone 44 and the speaker 42. As is known, bone microphones use the bones within a wearer's jaw to detect voice signals and/or to produce sound signals at the wearer's ear.

With the portable computer system 30 installed, the user may have both hands free to perform other activities, such as repairing devices, taking measurements or holding other instruments. Of course, the input device 46 may require one or both hands to operate, but is still preferably mounted in a hands-free manner with respect to the user.

Referring now to FIG. 2, the portable computer 34 includes a CPU; 50 coupled to a memory 52, which may be any type of memory including, for example, a disk drive (such as a hard, magnetic or optical disk storage device), RAM, ROM, EEPROM, EPROM, etc. The CPU 50, which can include one or any multiple number of processor units (or other hardwired or firmware elements) that operate independently or in a coordinated manner, executes one or more software applications (stored in the memory 52) using any of the inputs to the computer 34, information stored in the memory 52 and/or information provided from the host system via the transceiver 36. The CPU 50 also provides outputs to the peripheral devices, as well as to the host system via the remote communication device, i.e., the transceiver 36. In the embodiment of FIG. 2, the CPU 50 is illustrated as including a controller 54 that may be implemented in hardware or software and that executes the operating system associated with the computer 34 to recognize different inputs from the peripheral devices and other components of the computer 34. Additionally, the controller 54 may execute one or more applications as described in greater detail below. The CPU 50 illustrated in FIG. 2 may include or execute a speech/voice recognition unit or application 56, an optical character recognition (OCR) unit or application 60, a speaker driver 62 and a HUD driver 64. Furthermore, the CPU 50 may be coupled to a video frame grabber 68, which may be provided on a separate video processing board.

The speech/voice recognition unit 56, which may be, for example, the Dragon Dictate system sold by Dragon Systems of Boston, Mass., or any other desired speech/voice recognition unit, is typically implemented in software as an application, but may alternatively be executed on a separate processor board. In any event, the speech/voice recognition unit 56 receives speech, voice or other sound signals from the microphone 44, performs speech and/or voice recognition processing thereon and delivers commands to the controller 54 based on recognized voice inputs. The speech/voice recognition unit 56 may perform any desired or known processing on the received voice signals to identify certain recognized speech commands or words. During this process, the speech/voice recognition unit 56 may compare an identified voice command to a list of stored or recognized commands (stored in, for example, the memory 52) to determine if a valid command is being delivered by the user. If a recognized and authorized command has been received, the speech/voice recognition unit 56 may deliver the command to the controller 54 for further processing. Of course, if desired, the controller 54 may determine if a voice command is a valid or recognized command within the context of the application being run on the controller 54 and may notify the user when an unrecognized and/or unauthorized command is received. The speech/voice recognition unit 56 may also have learning capabilities and may be adapted to recognize a particular voice, a group of voices, or speech generally, as is known.

FIG. 3 illustrates a block diagram of a software routine 80 that processes a speech or voice signal to identify commands and which may be executed by the portable computer system 30 to enable a user to enter data or commands verbally and, therefore, in a hands-free manner. A block 82 of the routine 80 receives a voice signal from the microphone 44. A block 84 processes the voice signal to identify a command within the signal using any desired or standard speech or voice recognition processing routine, such as that indicated above. A block 86 then compares the identified command or input with a set of commands stored in, for example, the memory 52, to determine if the command is valid (i.e., the command matches a command within the set of commands) and/or authorized (i.e., the particular voice is that of a user having authority to carry out the requested command). If the block 88 determines that the voice command is valid and authorized, a block 90 provides the command to the controller 54 to be used by any application that is expecting such a command. Thereafter, or if the voice command signal is not recognized as a valid or authorized command at the block 88, control is returned to the block 82, which receives and processes further voice signals. Of course, if an invalid or unauthorized command has been received, the routine 80 may display an appropriate indication or message to the user and/or may display a message at the operator workstation 14 (FIG. 1).

The video processing unit provided within the computer 34 of FIG. 2 includes the frame grabber 68 coupled to the OCR unit 60, but may also include other video or image processing hardware/software as well. The frame grabber 68 may be, for example, a Nogatek board sold by the Nogatek Company, while the OCR unit 60 may be, for example, the Carina real-time OCR package, which is sold by Adaptive Recognition Hungary (ARH), located in Budapest, Hungary. While the ARH OCR unit has previously been used to identify license plate numbers on vehicles, it is believed that this product or a derivative of this product (having only minor modifications thereto) would operate satisfactorily to recognize device features as described below. Of course, other suitable frame grabber boards and OCR packages could be used instead. As illustrated in FIG. 2, the frame grabber 68 receives an image signal (having multiple image frames therein) from the video camera 38 and provides an output frame to the OCR unit 60. Of course, if the imaging device 38 produces a still image, such as that produced by a digital camera, the frame grabber 68 may be unnecessary.

The OCR unit 60 may process the received image to identify device features within the image, and these device features may then be used to identify one or more devices within the field of view of the video camera 38. For example, the OCR unit 60 may look for and recognize predetermined symbols, such as alphanumeric symbols located on field devices, and provide such recognized symbols to the controller 54 for device identification. Of course, if desired, the output of the video camera 38 may be used for other purposes. For example, the video image may be provided to the controller 54 to be displayed on the HUD 40 and/or may be sent to the host computer 14 via the transceiver 36 for viewing or and/or processing by the host computer 14.

Referring to FIG. 4, a routine 100 illustrated in flow chart form may be implemented in software executed by the computer 34 to automatically recognize devices within the field of view of the wearer based on the video input collected by the imaging device 38. A block 102 obtains a video or other image from the imaging device 38. If the imaging device 38 is a video camera, the block 102 may use the frame grabber 68 to grab a particular video frame. However, if the imaging device is, for example, a digital camera, the block 102 may access the image directly without the aid of the frame grabber 68.

A block 104 then processes the obtained video image or frame to identify potential device features within the video frame. In one embodiment, the device feature is a device tag mandated to be placed on each of the field devices within a process control environment by OSHA. Usually, such device tags include a rectangular holder or frame (typically one to two inches high by three to four inches wide) having alpha-numeric characters etched or otherwise engraved or carved therein to be visible to persons within the process environment. The alpha-numeric characters are usually a different color than the frame to make these characters more visible. When recognizing device tags, the block 104 scans the image to identify areas likely to contain device tags, such as rectangular areas within the image, areas with certain ranges of colors, areas having alpha-numeric characters therein, etc. Of course any desired processing may be used to search for these device features. Thereafter, a block 106 recognizes or decodes the device features within the identified areas. In particular, when device tags are being identified, the block 106 may apply optical character recognition (using the OCR 60) on the identified features to produce a preliminary device ID. If more than one device is within the image being processed, the blocks 104 and 106 may recognize numerous device features (such as device tags) and identify numerous preliminary device IDs.

Next, a block 108 compares each of the preliminary device IDs to a list of device IDs stored in, for example, the memory 52 to verify the existence of devices corresponding to the preliminary device IDs. If corresponding devices exist, the device IDs are verified and each of the verified IDs is provided by a block 110 to the controller 54 for use in other applications, to be displayed to the wearer via the HUD 40 and/or to be sent to the host computer 14 via the transceiver 36.

While the routine 100 can identify devices based on any observable features, it is preferable that the routine 100 identify devices based on device features, i.e., features that are part of the device as it is placed in the field without regard to automatic detection and identification by the portable computer system 30. In other words, while it would be possible to place bar codes or other unique identifiers on each of the devices within a process control environment, it is preferable to have the routine 100 identify devices based on features that are not placed on the device solely for the purpose of detection by the portable computer system 30, i.e., features already existing on the device for other purposes. If detection and identification is performed using such device features, then no additional steps need to be taken to label or otherwise mark each device within a process control environment for the specific purpose of being identified by a portable computer.

Other applications which, for example, automatically display information to the wearer via the HUD 40 may display the identified devices to the wearer, may display other information pertaining to the identified device(s) to the wearer via the HUD and/or may send the identified device IDs to the host system 14. Of course, the list of recognized devices may be stored in the memory 52 of the computer 34 or within a different memory, such as a memory within the host system 14 which can be accessed via remote communications by the block 108 to verify preliminary device IDS. As will be understood, it is not essential that each of the blocks of the routine 100 be executed within the portable computer system 30. Instead, one or more of these blocks can be executed by the host computer 14, which can communicate with the portable computer system 30 to perform the routine 100.

Referring again to FIG. 2, the speaker driver 62 receives signals from the controller 54 and processes these signals by, for example, converting them to standard analog audio signals, amplifying them, etc. The speaker driver 62 may then provide the processed signal to the speaker 42. As will be readily understood, the speaker driver 62 and the controller 54 may be used to play prerecorded signals stored in, for example, the memory 52 or the memory of the host computer 14 and/or may be used to relay real-time audio produced by or at the host system, such as the voice of an operator located at the host system, or the voice of another portable computer user located elsewhere within the process control environment. The voice or audio signals to be played on the speaker 42 may be provided to the computer 34 via the transceiver 36 from the host system or may be provided using any other audio communication system coupled to the computer 34.

Similarly, the HUD driver 64 receives signals from the controller 54, including graphical information to be displayed on the HUD 40, and preforms appropriate processing on these signals for display via the HUD 40. In some embodiments, the HUD driver 64 and the HUD 40 may be used in conjunction with the twiddler 46 or microphone 44 to provide a standard computer operating environment, such as a Windows image having dialogue boxes, text, graphics and the like. With this environment, the wearer can move a cursor, enter information or manipulate the image on the HUD 40 to, for example, run an application or make decisions within the context of an application being executed by the computer 34.

The controller 54 may use the transceiver 36 in any desired or standard manner, and provides signals to the transceiver 36 for communication to the host system 14 using any desired communication protocol. Likewise, the controller 54 receives and decodes communications from the host computer 14 via the transceiver 36 using any desired communication protocol.

The portable computer system 30 of FIG. 2 may be used to provide a variety of information to the user and/or to perform functions within the process control environment that make the user's tasks easier and quicker when the user is, for example, inspecting, installing, repairing, optimizing, diagnosing, calibrating and checking the connections of different devices within the process control environment. For example, using the portable computer system 30, a user can obtain and view information pertaining to certain devices or areas within the process control environment via the HUD 40 either automatically or after appropriate input via one of the peripherals. The computer 34 may store, or may communicate with the host computer 14 to obtain, any desired information pertaining to a particular device or to the process control system in general and display that information to the wearer via the HUD 40 at the request of the user or when the portable computer system 30 recognizes a device within the field of view of the user as described above. The displayed information may include process information, such as schematics or operator overviews of the process control system, device information such as device lists, help information, diagnostic information and even process parameter information (such as measurements, parameter values, etc.) made by or associated with one of more of the devices connected within the process control system.

To view such information, the wearer can, when walking by a device, enter a device identifier, such as a device tag or a device number, which may cause the controller 54 to automatically display certain kinds of device information, such as help, calibration, diagnostics, parameter values, etc. Of course the user can enter the device identifier using the twiddler 46, the microphone 44 or any other input device. When using the microphone 44, the speech/voice recognition unit 56 can identify, for example, a spoken device tag number or name and provide that device tag number or name to the controller 54. If desired, the speech/voice recognition unit 56 can be set up to receive a device number, a device name or any other device identifier and compare the entered identifier to a list of valid device numbers or names within the memory 52.

The GPS unit 47 may be used to further enhance the display, information gathering, and processing capabilities of the portable computer system described herein. By way of example, the GPS unit 47 may provide coordinates and/or other relatively precise location information to the computer 34, thereby enabling the computer 34 to determine where the user is currently located within a process control plant. Such location information may be used in or by the portable computer system 30 in a number of ways. For example, location information received from the GPS unit 47 may be used to facilitate the identification of devices within a process control system, particularly when individual device tags or identifiers are inaccessible, illegible or damaged, or are otherwise difficult to read or access. Also, such location information may help to resolve ambiguities such as, for example, when two or more devices within different locations of a process plant are using similar or identical tags or identifiers.

Further, the location information provided by the GPS unit 47 may be used to generate graphical maps or diagrams that may be displayed to a user via the HUD 40, thereby enabling the user to visualize their current location within the overall system. Such graphical maps or diagrams may also enable a user to more quickly determine how to efficiently travel to a desired location within the plant.

Still further, the location information provided by the GPS unit 47 may be used by the host system 14 to indicate to a system operator preciously where one or more portable computer system users are located within the plant. A system operator could, for example, use this location information to facilitate the dispatching of technicians, repair personnel, maintenance personnel, etc. in an efficient manner.

In one embodiment, as described above, the devices within the field of view of the user may be automatically detected by the video processing circuitry and, when such detection takes place, information about the device may be automatically displayed to the user via the HUD 40 in any desired format. If the information is stored in the memory 52, the information can be automatically accessed by the controller 54 and provided or displayed via the HUD 40 using the HUD driver 64. Alternatively, if the information is stored within the host system 14, the controller 54 may request and receive the appropriate information via the transceiver 36 and then display such information on the HUD 40. In the case of process parameters measured by or stored within a device, the host system may communicate with the device to obtain the most recent values or data before delivering that information to the portable computer system 30.

In any of these cases, the controller 54 can display a list of recognized devices to a user and allow the user to choose to view information about any of the devices or, alternatively, the controller 54 can automatically display information about the recognized devices via the HUD 40. Significantly, the use of the microphone 44, the video camera 38 and the other associated hardware/software on the computer system 30 enables the user to receive and view information pertaining to devices (or areas or other units of the process control system) and location automatically in a hands-free manner, i.e., without having to enter any data or other information via a hand-held or hand manipulated device. This leaves the wearer's hands free to perform other tasks, such as repairing, replacing or calibrating a device, manipulating other tools, etc., which is very advantageous. Still further, the computer system 30 can receive and display information measured by or stored within devices at which the user is actually looking and/or to which the user is physically near, without the need for separate dials or displays being physically located on the outside of each device and being physically accessible and viewable by the user.

In another embodiment, the wearable computer system 30 may be used to provide a shared view (e.g., display) to an operator located at, for example, the host computer 14 and to the user via the HUD 40 to thereby enhance communications between the two. Such a shared view application displays the same image to both persons and allows one or both of these persons to manipulate the image to, for example, point out or highlight particular parts of the image or post data on the image. These actions can be used in conjunction with voice communications to enhance conversations between the portable computer user and an operator remotely located at the host computer 14.

FIG. 5 illustrates a block diagram of a software routine 116 that can be run on the host computer 14 and a block diagram of a software routine 118 that can be run on the portable computer system 30 to implement a shared view or display. The routine 118 includes a block 120 that collects and sends a video image to the host computer 14 via the transceiver 36. Communications between the portable computer system 30 and the host computer 14 are illustrated in FIG. 5 by dotted lines. This image may be the entire multi-frame image produced by the video camera 38 or may be any one or more individual frames thereof. A block 122 within the routine 116 receives the video image and a block 124 displays the video image to the operator via a display device associated with the host computer 14. A block 126 enables the operator at the host computer 14 to choose a frame of the video image to be used as the basis for the shared view (i.e., a base image). The block 126 may, for example, simply display the most recently received frame of the received video signal and wait for the operator to indicate that a freeze of the image is requested. Alternatively, the block 126 may allow the operator to replay received frames to choose a desired image or may allow the operator to choose a base image in any other desired manner. If the operator does not choose a base image for the shared display, the block 126 provides control back to the block 122. If the operator chooses a base image at the block 126, a block 128 sends the selected base image to the portable computer system 30 for display to the user on the HUD 40. The block 128 may also, if desired, display the selected base image to the operator via the display of the host computer 14.

Next, a block 130 within the routine 116 determines whether changes to the base image are being made or requested by the host computer operator. Such changes may include, for example, moving a cursor or a pointer, drawing on the image, highlighting areas of the image, posting information or other data on the image, or any other desired changes which enable the operator to communicate with the remotely situated user using the image. These changes may be made by the operator using any desired operating system protocols and peripheral devices, such as a mouse and a keyboard. If changes to the image are made by the operator, a block 132 sends the changes to the portable computer system 30 via the transceivers 32 and 36. The changes may be communicated using any desired protocol and either the specific changes being made or an entire new image frame having the changes therein can be sent to the portable computer system 30 as desired. In one embodiment, changes to the image in the form of pointer movements may be communicated as new pointer coordinates. After image changes have been made and sent to the portable computer system 30, or if no new changes are made by the host operator, a block 134 refreshes the image of the host system (incorporating changes made by the operator as well as changes made by the portable computer system 30 and sent to the host system 14). Control of the routine 118 is then returned to the block 130 to detect other changes made by the host operator.

Meanwhile, the routine 118 includes a block 136 that displays the base image received from the host system on the HUD 40. A block 138 then detects changes to the image made by the user using any available input device including the microphone 44 and the twiddler 46. If the user makes changes to the displayed image, a block 140 sends the changes to the host computer 14. Thereafter, or if no user initiated changes are detected, a block 142 refreshes the image on the HUD 40 incorporating changes made by the user as well as changes made by and received from the host computer 14. Control of the routine 118 is then returned to the block 138 for detection of further user initiated changes.

In this manner, the routines 116 and 118 operate on the host computer 14 and on the portable computer system 30 to provide a shared view or scene that can be manipulated by one or both of the host operator and the remotely situated user to enhance communications between the two. While the base image has been described herein as being derived from an image collected by the portable computer system 30, this need not be the case. Instead, the base image could be a stored operator view, schematic, etc. related to the process or device of interest. In either case, the shared view enables the host operator to point out and talk about different elements within the displayed image in a manner that is easily viewable by the portable computer user. Furthermore, if desired, the user can make changes to the image using, for example, the same or a different cursor to aid conversations with the host operator. If desired, the user need not be able to make changes to the image, which simplifies the routines 116 and 118 of FIG. 5. Also, if desired, the user may select the base image to be used before it is sent to the host computer 14.

Another use of the portable computer system 30 within a process control environment will be described in conjunction with the routine 150, illustrated in flow chart form in FIG. 6, which is preferably, but not necessarily, executed within the portable computer system 30. Generally speaking, the routine 150 enables the user to check out and verify the proper connection of different devices or communication channels (such as I/O connections) within a process control environment in a hands-free manner and without the aid of an operator at a host device. Previously, verifying the proper connections of the devices or communication channels within a process control environment required a technician to go out into the field with a hand-held measurement device, such as a voltmeter, and a hand-held radio, which the technician used to communicate with an operator at a host workstation. The technician first had to go to a device (and had to find it), indicate to the host operator via the hand-held radio that he or she was at the device and then indicate which communication channel he or she was going to check. At this point, the technician had to use a hand-held meter to measure the signal on the line. The technician then told the host operator, via the hand-held radio, what the measured signal was so that the host operator could verify whether the measured signal was the actual signal on the selected communication channel. Thereafter, the technician would tell the host operator to change the signal on the channel being tested and the host operator would cause the signal or value of the communication channel to be changed. The technician would then measure the signal on the channel again to see if the change actually occurred. As is evident, this process required two persons (e.g., a host operator and a technician) a lot of cumbersome communications between the host operator and a technician and was difficult to implement in a large and complex process control environment where the technician was trying to simultaneously manipulate a hand-held radio, a hand-held meter and obtain access to appropriate devices or communication lines. Furthermore, this process relied on communications between a host operator and the technician, which tended to create confusion and to introduce errors.

Using the routine 150 of FIG. 6, a portable computer user can test device communication channel connections, such as I/O connections, within a process control system in a relatively hands-free manner (i.e., holding only a measurement device) and without the need to communicate with an operator located at a host workstation. Instead, the portable computer system 30 communicates directly with the host computer to provide the user with all the information needed and to make changes requested by the user necessary to check out the connections of a device or a communication channel within the process control system. Using the routine 150, the user can go out into the process control environment or plant, obtain a list of devices and/or communication channels associated with a device, choose a particular device and/or communication channel for testing, find out what the signal on the device or channel being tested should be, make changes to the signal and measure both the original signal and the changed signal to test the proper connection of the device or channel, all without the need for a host operator and the cumbersome, error-prone communications associated therewith.

The routine 150 includes a block 152 that displays a list of devices that may be tested on the HUD 40. The user may select a particular device to be tested by selecting one of the listed devices in any desired manner. Preferably, the user speaks commands into the microphone, such as UP, DOWN, LEFT, RIGHT, ENTER, etc., which are recognized and provided to the controller 54 and that are used to move a cursor (which may be a highlighted area) or to select items displayed on a Windows screen on the HUD 40. Of course, the user may also select a device using the twiddler 46 or other keyboard device, by using the microphone to enter the name or tag associated with a device, or using the video camera 38 to automatically identify a device as described with respect to the routine 100 of FIG. 4.

Figure 7:
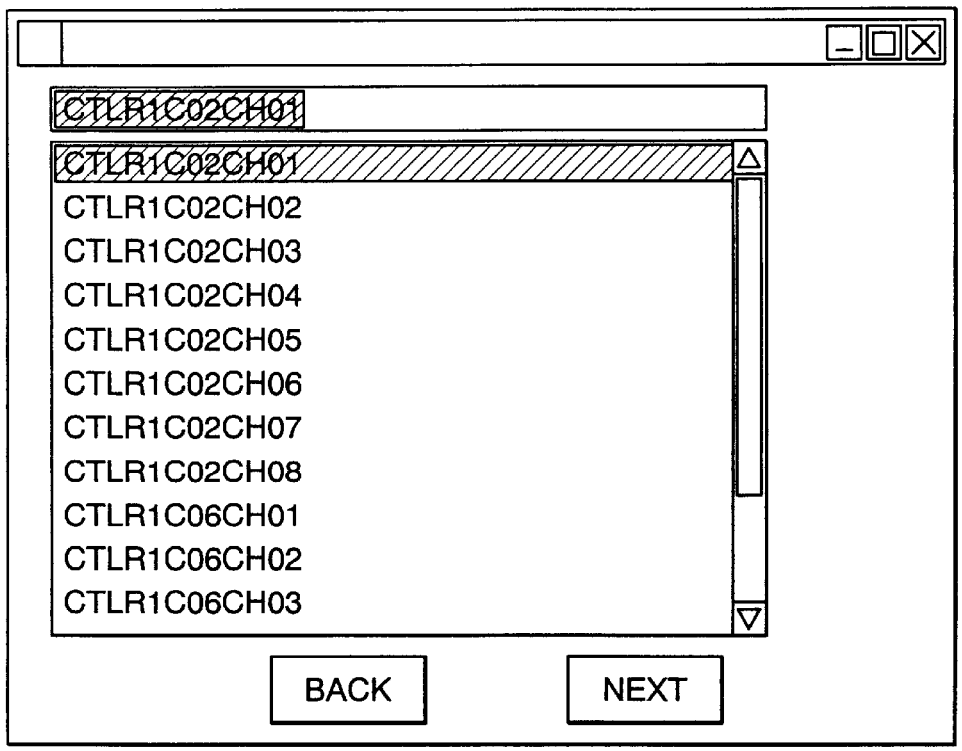
FIG. 7 is a first portable computer screen display used in the software routine of FIG. 6.

A block 154 waits for the user to select a device and, after a device is selected or otherwise chosen by the user, a block 156 displays, via the HUD 40, a list of communication channels associated with the selected device. An example of such a display using a Windows-type display screen is illustrated in FIG. 7 and includes a set of 11 communication channels for the device CTLR1 (controller 1) with the first channel CTLR1CO2CHO1 being highlighted. Of course, the list of I/O or other communication channels may be displayed in any other manner and is not limited to that of FIG. 7.

Referring again to FIG. 6, a block 158 waits for the user to select a communication channel to be checked. The user may select a particular channel displayed in, for example, the screen of FIG. 7 using simple voice commands such as "BACK" and "NEXT" to move the cursor to a different channel and "ENTER" to select that channel. Thus, to select the third communication channel (CTLR1C02CH03) when viewing the display screen of FIG. 7, the user may simply say "NEXT" twice to highlight the channel CTLR1C02CH03 and then say "ENTER" to select that channel. While other voice commands can be used, it is preferable to limit the set of voice commands to simple words that can be recognized more easily by the speech/voice recognition unit 56. Also, while the display screen of FIG. 7 may be manipulated using other input devices, such as the twiddler 46, it is preferable to enable the user to manipulate the screen and select or enter data on the screen using voice signals or using other hands-free input devices that allow the user to use both of his or her hands for other activities.

Figure 8:
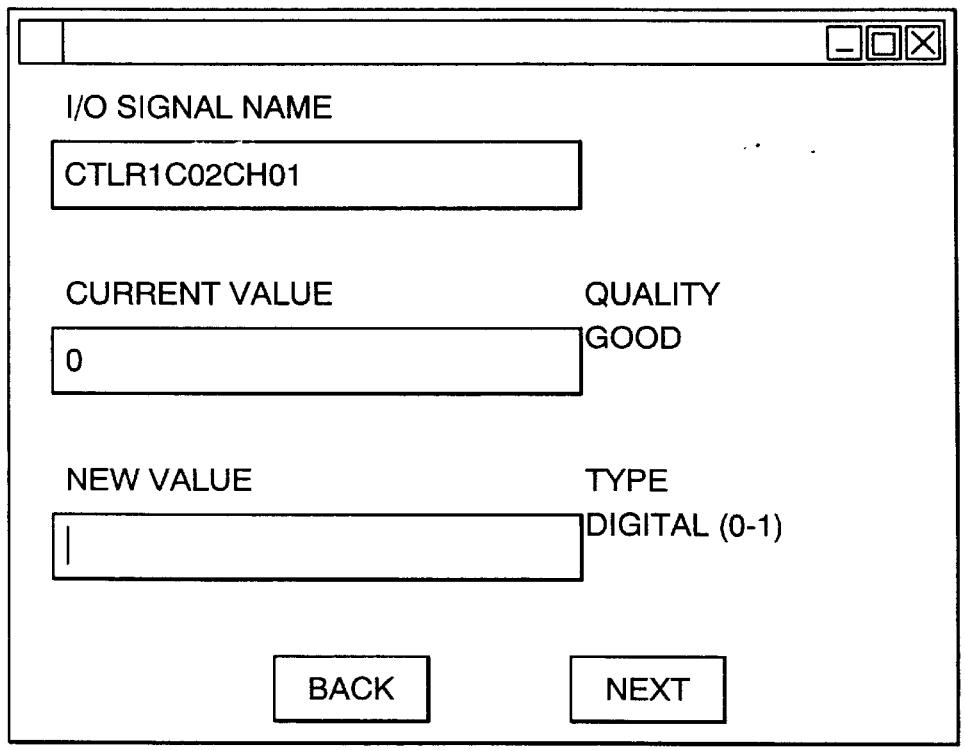
FIG. 8 is a second portable computer screen display used in the software routine of FIG. 6.
Figure 9:
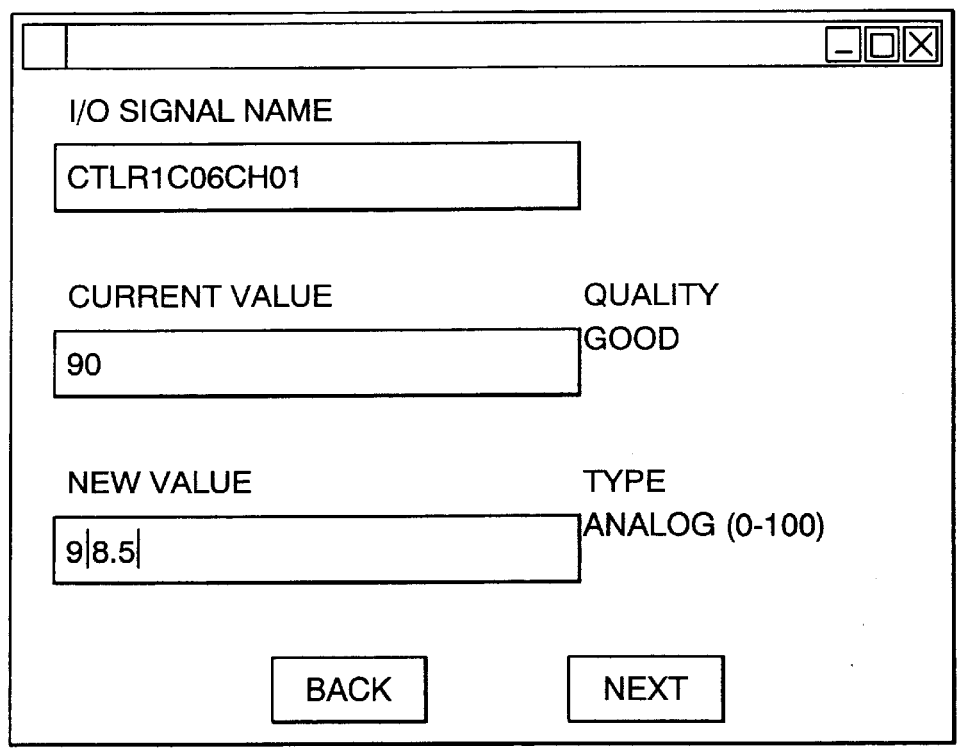
FIG. 9 is another portable computer screen display used in the software routine of FIG. 6.

After a user has selected a particular communication channel to check, a block 160 displays a further screen on the HUD 40 that indicates process information corresponding to the selected channel. An example of such a screen is illustrated in FIG. 8 for the selected channel of CTLR1C02CH01. To create the screen of FIG. 8, the block 160 obtains the current process value of the selected communication channel from the host system via the transceiver 36 and displays the current value of that channel (in this case "0") along with an indication of the quality of the signal (in this case "good"). The block 160 also provides an area for the user to enter a new process value for the channel and indicates the type of signal on that channel, that is, whether the channel is an analog channel or a digital channel, and the valid ranges of that signal. The information displayed on the screen is either stored in the memory 52 of the portable computer system 30 or is obtained from the host computer 14, which either stores that information in a memory or obtains the information from a device. In the illustrated example of FIG. 8, the channel CTLR1C02CH01, is a digital channel currently set to the value of zero. FIG. 9 illustrates a similar screen displayed on the HUD 40 for the channel CTLR1C06CH01, which is an analog channel having a valid range of 0–100 and which has a current value of 90.

When viewing the screen of FIG. 8 or 9, the user can manually measure the value on the selected channel using, for example, a hand-held voltmeter or any other desired device. If the measured value is the same as the value listed in the current value field of the screen, then the user may continue by entering a new value in the new value field. Referring again to FIG. 6, a block 162 waits for the user to enter a new process value, preferably using voice commands in the form of numbers and other simple commands such as "ENTER," "BACK" and "NEXT," so that the user does not have to remove his or her hands from the metering device. A new value of 98.5 is being entered into the new value field of the screen display of FIG. 9. Upon receiving a new value, a block 164 sends that new value to the host system, which then changes the selected channel to the new value and, after verifying that the selected channel has been changed to the new value, sends the new value to the portable computer system 30 as the current value of the selected channel. A block 166 then refreshes the screen display on the HUD 40 to indicate that the current value has been changed to the previously entered new value and clears the new value field to enable the user to enter a different new value. At this time, the user can measure the signal on the selected channel using the hand-held meter to see if the signal has changed to the entered new value. If so, then the communication channel is most likely correctly connected and operating within the process control system. If not, then a problem exists which must be identified and corrected. Of course, the user may make further changes to the communication channel value and measure those changes, or may scroll back to the channel or device selection screens to select a different channel or device to be checked.

Using the system described above, a single person may verify the proper connection and operation of different communication channels within a process control environment without needing to talk to and coordinate with an operator located at a host station and without needing to carry a hand-held radio, which typically interferes with the measurements and other activities being performed in the field.

In another embodiment, the portable computer system 30 can be used to store and automatically retrieve information pertaining to any device or object within a process control environment, including devices that have device tags or other recognizable device features and objects such as walkways, trash cans, buildings, etc. that do not typically have device tags associated therewith. Using the portable computer system 30 in this manner, a user can travel through a plant or other process control environment and record voice messages (or other information or data) pertaining to devices or objects within the plant for future retrieval either by that user or by another person. Likewise, upon seeing a device or other object, the user can determine (by looking at the display on the HUD 40) if any voice messages have been previously created for that device and can retrieve such previously created voice messages. Additionally or alternatively, location information provided by the GPS unit 47 may be used to automatically cause messages associated with devices that are physically near the user to appear, even if the user is not currently looking at these devices.

In one embodiment, a software routine for implementing this functionality (which may be stored in and executed by the processor or CPU 50 of the computer 34) includes three basic routines, which may be separate routines or which may all be subparts of a single routine. The first routine identifies one or more devices that are within the field of view of the user or that are of interest to the user. This routine may, for example, accept voice inputs (from the microphone 44) in the form of device names, tags or other device identifiers to identify devices that are currently of interest to the user. Similarly, this routine may display a list of devices to the user via the HUD 40 and enable the user to select one of the displayed devices using, for example, voice commands or other inputs. Alternatively, this routine may automatically identify devices using the video image processing routine described above with respect to FIG. 4, which identifies one or more visible device features. Instead of using device features, the automatic video processing routine may identify a device based on identifiers placed on or near the device for the specific purpose of identifying the device (such as optical bar codes). On the other hand, transmitters may be placed on or near one or more devices and these transmitters may send out a signal which is received by the computer 34 and decoded by the routine to identify the one or more devices. In one embodiment, a single transmitter may be used for a room or other unit area and, upon receiving and decoding the transmitted signal, the routine may access a memory (located, for example, in either the computer 34 or the host computer 14) that stores all of the devices within that room or unit area. A list of these devices may then be provided to the wearer via the HUD 40. Similarly, devices that do not have tags or other automatically recognizable features may be tied (in a database) to devices that have such automatically recognizable features. Typically, devices in close proximity to one another will be tied together (associated with one another) in the database. Thereafter, whenever one of the devices having an automatically recognizable feature (a tagged device) is identified, the routine may consult the database to determine other non-tagged devices that are near to, or that are otherwise associated with the tagged device and display a list of all of these devices to the wearer via the HUD 40. Of course, other methods of identifying devices can be used as well.

When one or more devices have been identified and, for example, displayed to the user via the HUD 40, a second routine enables the user to store a voice message to be associated with one of the identified devices. The user may select one of the identified devices (using, for example, voice commands or any other type of input) and then, when prompted via the HUD 40, speak into the microphone 44 to create a voice message. The second routine then stores the voice message in a memory as being associated with the identified/selected device. This memory may be the memory 52 on the computer 34 or, preferably, may be a memory somewhere within the host system such as in the host computer 14. When stored on the host computer 14, the voice message is available to more than one portable computer.

A third routine determines if any previously stored voice messages exist for any of the devices identified by the first routine and, if so, displays an indication, such as an icon, on the HUD 40 to tell the user that a previously stored message exists for that identified device. When the user selects the icon using, for example, voice commands, the third routine retrieves the previously stored voice message from the memory and plays it to the user via the speaker 42.

Using this data storage/retrieval technique, whenever a portable computer user (or an operator of the host system 14) identifies a device, either manually or automatically, the user (or the operator) can record a voice message to be associated with that device and can, likewise, retrieve and hear previously stored voice messages associated with that device. In this manner, a user (or operator) may make notes or leave messages about a device or any other object within the process control system that can later be retrieved by the same or a different person. Such a message may, for example, inform the next person that repair is ongoing on the device, or that calibration of the device needs to be performed, or may be any other desired message pertaining to the device or object. In one simple example, a user may walk down a walkway within the process control environment or plant and notice that the walkway needs to be repainted or repaired. The walkway may be identified automatically based on the room that the user is in, or using, for example, the GPS unit 47, based on the proximity of the walkway to other devices that can be automatically identified using device features, based on specific codes or other features placed on the walkway to enable automatic identification, based on user generated input of any kind including voice input and hand operated device input, or in any other manner. The user may select the walkway on the HUD 40 and then make a voice message describing the repair to be made to the walkway. Thereafter, whenever the walkway is recognized as being of interest or as being viewed by a user of a portable computer (or an operator at the host computer 14), the voice message may be automatically made available to that user (or operator) and is indicated as being available by an icon, which may also be a text message associated with that walkway on the HUD 40. In this manner, new information may be created and stored as associated with any device or object within a process control environment and this information may be later provided to a user in the same manner and/or at the same time that other, more standard information (such as help information) is made available to a user.

While the portable computer system is primarily described herein as being programmed to carry out field device maintenance, repair and troubleshooting activities, the portable computer may execute and/or carry out a variety of other activities. In particular, a number of applications may be stored within the portable computer system 30 and/or executed by the operator workstation 14 and accessed by the computer system 30 via the transceivers 32 and 36. By way of example, the portable computer system 30 may carry out process control diagnostic activities such as those disclosed by U.S. patent application Ser. No. 09/256,585 entitled "Diagnostics in a Process Control System," which was filed on Feb. 22, 1999 and which is hereby incorporated by reference herein in its entirety. The diagnostic activities may include the use of a diagnostic expert system such as, for example, that disclosed by U.S. patent application Ser. No. 09/499,445 entitled "Diagnostic Expert in a Process Control System," which was filed on Feb. 7, 2000 and which is hereby incorporated by reference herein in its entirety. Still further, the diagnostic activities may include the detection and diagnosis of wiring faults such as those disclosed by U.S. patent application Ser. No. 09/850,300 entitled "Wiring Fault Detection, Diagnosis and Reporting for Process Control Systems," which was filed on Apr. 19, 2001 and which is hereby incorporated by reference herein in its entirety.

More generally, however, the portable computer system 30 may be adapted to carry out any of the activities that are typically carried out, or which could be carried out, by the operator workstation 14. Similarly, the portable computer system described herein may be used as an operator interface within any modem process control system. Modern process control systems are typically microprocessor-based distributed control systems (DCSs). A traditional DCS configuration includes one or more user interface devices, such as workstations, connected by a databus (e.g., Ethernet) to one or more controllers. The controllers are generally located physically close to a controlled process and are connected to numerous electronic monitoring devices and field devices such as electronic sensors, transmitters, current-to-pressure transducers, valve positioners, etc. that are located throughout the process.

In a traditional DCS, control tasks are distributed by providing a control algorithm within each of the controllers. The controllers independently execute the control algorithms to control the field devices coupled to the controllers. This decentralization of control tasks provides greater overall system flexibility. For example, if a user desires to add a new process or part of a process to the DCS, the user can add an additional controller (having an appropriate control algorithm) connected to appropriate sensors, actuators, etc. Alternatively, if the user desires to modify an existing process, new control parameters or control algorithms may, for example, be downloaded from a user interface to an appropriate controller via the databus.

To provide for improved modularity and inter-manufacturer compatibility, process controls manufacturers have more recently moved toward even further decentralization of control within a process. These more recent approaches are based on smart field devices that communicate using an open protocol such as the HART®, PROFIBUS®, WORLDFIP®, Device-Net®, CAN, and Fieldbus protocols. These smart field devices are essentially microprocessor-based devices such as sensors, actuators, etc. that, in some cases, such as with Fieldbus devices, also perform some control loop functions traditionally executed by a DCS controller. Because some smart field devices provide control capability and communicate using an open protocol, field devices from a variety of manufacturers can communicate with one another on a common digital databus and can interoperate to execute a control loop without the intervention of a traditional DCS controller or any other databus suitable for the transmission of data.

The controllers and other devices distributed throughout such modem process control systems are communicatively coupled to one or more operator workstations via a system level data bus such as, for example, an ethernet, or any other suitable digital communication bus. As is well known, one or more data historians may also be communicatively coupled to the workstations and other devices within the process control system via the system level data bus.

Thus, the portable computer system described herein may be communicatively coupled to a system level data bus within any process control system either via a workstation that includes a wireless transceiver, some other device in communication with the system level data bus that provides a wireless communication interface, or any other wireless communication interface that enables the portable computer to interact and exchange process information and other information with the process control system. In this manner, a system operator or user can remotely interact with the process control system via the portable computer system while, for example, walking through the process plant, without having to use a walkie-talkie to communicate with another person at a fixed host operator workstation or system. As a result, the portable computer system described herein enables a single user to interact with the process control system from any location within the process control plant, or possibly outside of the physical process control plant, as if the interaction were occurring via a conventional operator workstation.

Figure 10:
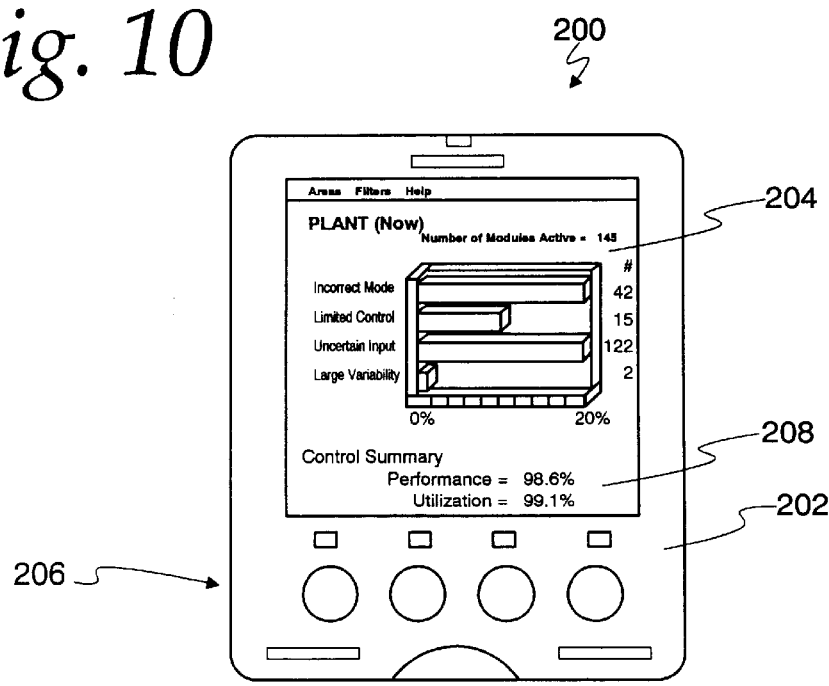
FIG. 10 is a diagrammatic view of a hand-held computer that may be used as the portable computer shown in FIGS. 1 and 2.

FIG. 10 is a diagrammatic view of a hand-held portable computer 200 that may be used within the portable computer system described herein. As shown in FIG. 10, the hand-held computer 200 includes an outer housing 202, an electronic display 204 and a keypad 206, all of which may be disposed within the housing 202 as shown in FIG. 10. The outer housing 202 may be made from any suitable material, such as, for example, a plastic material, a rubber material or any other suitable material. Preferably, but not necessarily, the outer housing 202 is dimensioned to facilitate hand-held use of the hand-held computer 200. By way of example, the outer housing 202 may include features that facilitate gripping of the outer housing 202 or that facilitate attachment of the outer housing 202 to a belt or any other carrying device that may be worn by a user. Alternatively or additionally, the outer housing 202 may include a feature that enables the hand-held device 202 to be placed in a self-standing configuration. In this manner, the user may set down the hand-held computer 200, thereby enabling hands-free operation of the hand-held computer 200, so that the user may more effectively carry out calibration activities, diagnostic activities or any other activities that may be more easily accomplished using one or both hands.

The display 204 may be any electronic display that enables the display of textual and/or graphical information. By way of example, the display 204 may be based on liquid crystal, plasma, or any other suitable display technology. The keypad 206 may include a plurality of buttons and/or other electromechanical inputs that may be activated by the user to select and/or manipulate the information being shown in the display 204.

While the hand-held computer 200 is depicted in FIG. 10 as being based on a PDA device or platform, any other hand-held device or platform may be used instead without departing from the scope and the spirit of the invention. Additionally, different or additional user interface technologies may be incorporated within the hand-held computer 200. For example, the display 204 may incorporate a touch screen, in which case the keypad may be eliminated or made optional, a wireless (e.g., infrared, radio frequency, etc.) interface may be provided to enable the hand-held computer 200 to communicate with peripherals, such as those shown in FIGS. 1 and 2, etc. In general, the hand-held computer 200 may be used as the portable computer 34 shown in FIGS. 1 and 2 and may incorporate some of all of the peripherals and other functions associated with the portable computer system 30 shown therein.

Figure 11:
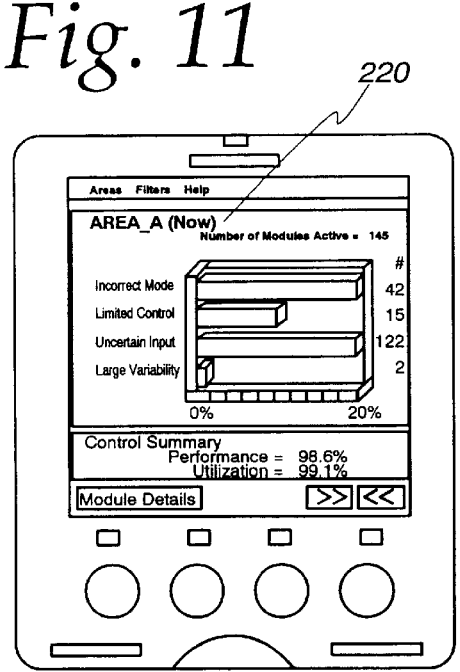
FIGS. 11–14 are diagrammatic views of various graphical images that may be displayed by the hand-held computer shown in FIG. 10.
Figure 12:
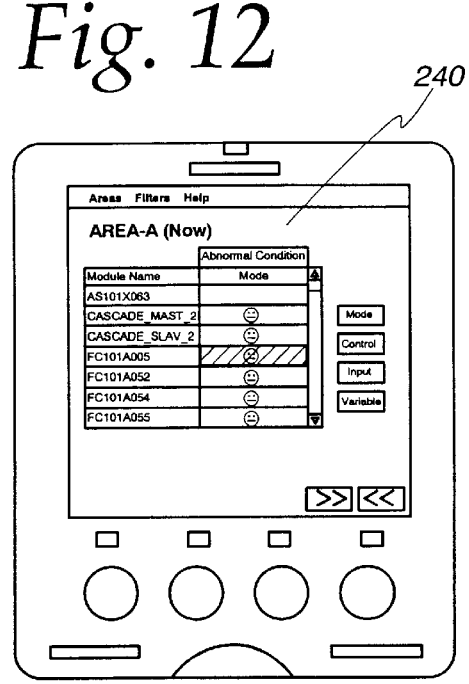
Figure 13:
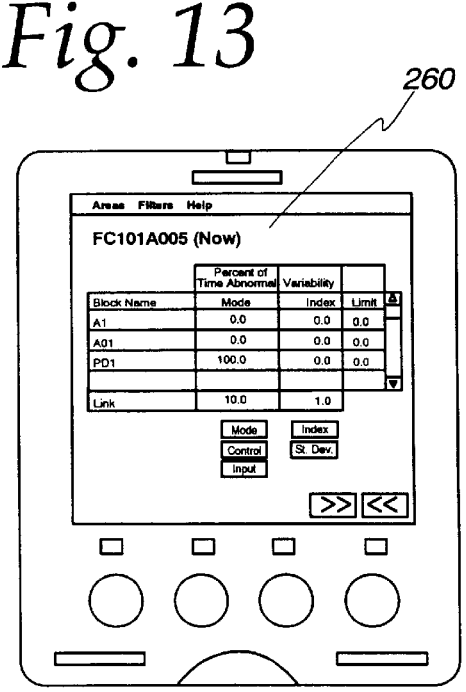
Figure 14:
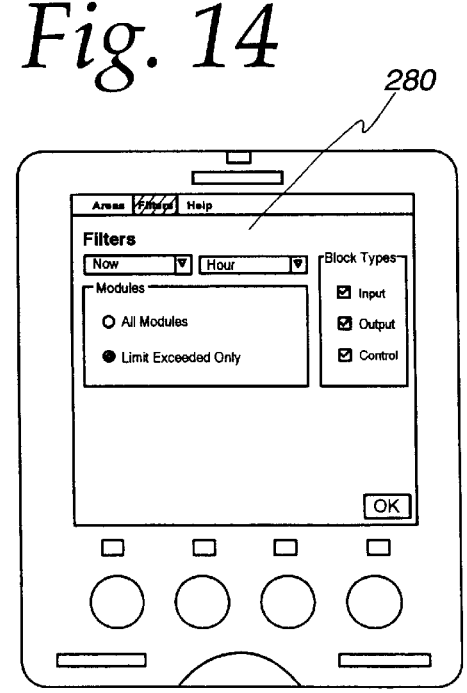

Additionally, the hand-held computer 200 may execute one or more applications, which may include one or more graphical user interface applications, that may be executed by a processor within the hand-held computer 200. As shown in FIG. 10, the hand-held computer 200 may display plant level information, which may include performance and/or utilization indexes 208 associated with the overall plant. Similarly, FIGS. 11–14 depict other exemplary graphical displays that may be provided to the user by the hand-held computer 200. In particular, FIG. 11 depicts a graphical display 220 that provides performance information for a particular area of a plant; FIG. 12 depicts a graphical display 240 that provides detailed module information, in tabular form, for the area of the plant associated with the graphical display of FIG. 11; FIG. 13 depicts a graphical display that provides detailed block information for one of the modules associated with the display of FIG. 12; and FIG. 13 depicts a graphical display that provides filter setting information that enables the user to control the manner in which modules and block information will be displayed by the hand-held computer 200.

The routines described herein may, of course, be implemented in a standard multi-purpose CPU or on specifically designed hardware or firmware as desired. When implemented in software, the software may be stored in any computer readable memory such as on a magnetic disk, an optical disk, or other storage medium, in a RAM or ROM of a computer or processor, etc. Likewise, this software may be delivered to a user or a device (such as the wearable computer) via any known or desired delivery method including, for example, on a computer readable disk or other transportable computer storage mechanism or over a communication channel such as a telephone line, the internet, etc. (which is viewed as being the same as or interchangeable with providing such software via a transportable storage medium).

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A portable computer for use in a process environment having a process control system including a plurality of process control devices disposed within the process environment externally to the portable computer, the portable computer comprising:
   a housing adapted for portable operation;
   a processing unit disposed within the housing;
   a computer readable memory disposed within the housing and coupled to the processing unit;
   a display disposed within the housing and coupled to the processing unit;
   an input device that provides an input signal to the processing unit;
   a first software routine stored in the computer readable memory and adapted to be executed by the processing unit that processes the input signal, sends a request to the process control system requesting a change to be made with respect to one or more of the plurality of process control devices and provides information pertaining to the process control system generated by the one or more of the plurality of process control devices during operation of the process via the display; and
   a second software routine stored on the process control system that receives the request from the first software routine and in response to the request generates a command to cause the change with respect to the one or more of the plurality of process control devices.

2. The portable computer of claim 1, wherein the housing is further adapted for hand-held operation.

3. The portable computer of claim 2, wherein the housing is further adapted to enable a user to wear the portable computer.

4. The portable computer of claim 2, wherein the portable computer is based on a personal data assistant platform.

5. The portable computer of claim 2, wherein the input device is a keypad that is disposed within the housing and coupled to the processing unit.

6. The portable computer of claim 1, wherein the input device is a global positioning system unit, the input signal contains location information and the first software routine includes a locating routine that identifies a device within the process control system based on the location information.

7. The portable computer of claim 1, wherein the input device is a global positioning system unit, the input signal contains location information and the first software routine includes a locating routine that identifies a location of the portable computer within the process control system.

8. The portable computer of claim 1, wherein the input signal is a user input received via the input device and the first software routine includes a routine that sends commands to the process control system based on the user input.

9. The portable computer of claim 1, wherein the first software routine includes a display routine that displays one of plant level information, area level information, module information and function block information associated with the process control system.

10. The portable computer of claim 1, wherein the input device is a microphone, the input signal is a voice signal provided by the microphone and the first software routine includes a voice recognition routine that identifies a device based on the voice signal.

11. The portable computer of claim 1, wherein the information pertaining to the process control system is one of diagnostic information, maintenance information and optimization information related to a device within the process control system.

12. The portable computer of claim 1, wherein the information pertaining to the process control system is help information related to a device within the process control system.

13. The portable computer of claim 1, further including a remote communication device that communicates with the process control system and wherein the information pertaining to the process control system includes a process value that is obtained from a device within the process control system and which is sent to the portable computer via the remote communication device.

14. The portable computer of claim 13, wherein the remote communication device is a wireless ethernet transceiver.

15. The portable computer of claim 1, wherein the input device is an imaging device, the input signal includes an image frame developed by the imaging device and the first software routine includes an optical character recognition routine that performs optical character recognition on the image frame.

16. The portable computer of claim 15, wherein the imaging device is a video camera, the input signal comprises a multi-frame video signal and the portable computer further includes a frame grabber that grabs the image frame from the multi-frame video signal and provides the image frame to the optical character recognition routine.

17. The portable computer of claim 16, wherein the optical character recognition routine finds and decodes a device identifier within the image frame.

18. The portable computer of claim 17, wherein the information pertaining to the process control system is diagnostic information related to a device associated with the decoded device identifier.

19. The portable computer of claim 17, wherein the information pertaining to the process control system is help information related to a device associated with the decoded device identifier.

20. The portable computer of claim 17, further including a remote communication device that communicates with the process control system and wherein the information pertaining to the process control system is a process value obtained by the process control system from a device associated with the decoded device identifier and sent to the portable computer via the remote communication device.

21. The portable computer of claim 1, wherein the first software routine includes one of a process optimization routine, a process diagnostics routine and a process alarm management routine.

22. A portable computer for use in a process control system having a host system and a plurality of process control devices disposed within the process control system externally to the portable computer, the portable computer comprising:
 a housing adapted for hand-held operation;
 a processing unit disposed within the housing;
 a computer readable memory disposed within the housing and coupled to the processing unit;
 a display disposed within the housing and coupled to the processing unit;
 a keypad disposed within the housing and coupled to the processing unit;
 a radio frequency transceiver disposed within the housing and coupled to the processing unit, wherein the radio frequency transceiver is adapted to communicate with the host system;
 a first software routine stored in the computer readable memory and adapted to be executed by the processing unit that processes a user input received from the keypad and sends a request to the host system requesting a change to be made with respect to one or more of the plurality of process control devices via the radio frequency transceiver;
 a second software routine stored on the host system that receives the request from the first software routine and in response to the request generates a command to cause the change with respect to the one or more of the plurality of process control devices; and
 a third software routine stored in the computer readable memory and adapted to be executed by the processing unit that receives process information that is generated by one or more of the plurality of process control devices during operation of a process and that is sent from the host system in response to the request via the radio frequency transceiver and displays the received process information via the display.

23. The portable computer of claim 22, wherein the housing is further adapted to enable a user to wear the portable computer.

24. The portable computer of claim 22, further including a global positioning system unit disposed within the housing and coupled to the processing unit.

25. The portable computer of claim 24, further including a fourth software routine stored on the computer readable memory and adapted to be executed by the processing unit that receives an input from the global positioning system unit and determines a location within the process control system based on the input from the global positioning system unit.

26. The portable computer of claim 25, further including a fifth software routine stored on the computer readable memory and adapted to be executed by the processing unit that identifies a device within the process control system based on the determined location.

27. The portable computer of claim 26, further including a sixth software routine stored on the computer readable memory and adapted to be executed by the processing unit that displays information pertaining to the identified device via the display.

28. The portable computer of claim 22, wherein the received process information is one of plant level information, area level information, module information and function block information associated with the process control system.

29. The portable computer of claim 22, further including a fourth software routine stored on the computer readable memory and adapted to be executed by the processing unit that performs one of a diagnostic function, an optimization function and a configuration function associated with the process control system.

30. A hand-held computer for interfacing with a process control system that has a plurality of process control devices disposed within a process externally to the hand-held computer, the hand-held computer comprising:
 a housing adapted for hand-held operation;
 a processor disposed within the housing;
 a computer readable memory disposed within the housing and coupled to the processor;
 an electronic display disposed within the housing and coupled to the processor;
 a keypad disposed within the housing and coupled to the processing unit;
 a transceiver disposed within the housing and communicatively coupled to the processing unit, wherein the transceiver is adapted to communicate with a remotely situated processor to receive process information generated by one or more of the plurality of process control devices during operation of a process;
 a first software routine stored in the computer readable memory and adapted to be executed by the processor that enables a user to send a request to the process control system requesting a change to be made to with respect to one or more of the plurality of process control devices; and
 a second software routine stored on the process control system that receives the request from the first software routine and in response to the request generates a command to cause the change with respect to the one or more of the plurality of process control devices.

31. The hand-held computer of claim 30, wherein the first software routine includes a routine that sends a request for information to the process control system and displays process information sent by the process control system in response to the request for information.

32. The hand-held computer of claim 31, wherein the process information includes one of diagnostic information, optimization information and configuration information.

33. The hand-held computer of claim 30, further comprising an input device disposed within the housing and coupled to the processor, wherein the first software routine includes a routine that receives an input signal from the input device and identifies a device proximate to the hand-held computer based on the input signal.

34. The hand-held computer of claim 33, wherein the input device is an imaging device and the input signal is a video image.

35. The hand-held computer of claim 33, wherein the input device is a global positioning system unit and the input signal is indicative of a geographic location of the hand-held computer.

* * * * *

UNITED STATES PATENT AND TRADEMARK OFFICE
CERTIFICATE OF CORRECTION

PATENT NO. : 6,806,847 B2 Page 1 of 1
DATED : October 19, 2004
INVENTOR(S) : Mark J. Nixon et al.

It is certified that error appears in the above-identified patent and that said Letters Patent is hereby corrected as shown below:

Title page,
Item [56], References Cited, insert the following:
-- OTHER PUBLICATIONS
Bauer et al., "A Collaborative Wearable System with Remote Sensing," *IEEE paper presented at International Symposium on Wearable Computers*, Pittsburgh, Pennsylvania, pp.10-17, (October 1998)

Rekimoto et al., "Augment-able Reality: Situated Communication through Physical and Digital Spaces," *IEEE paper presented at International Symposium on Wearable Computers*, Pittsburgh, Pennsylvania, pp. 68-75, (October 1998).

"Hats On For Process Control," *Control*, p. 28 (November 1997). --

Column 2,
Line 55, replace "require the use of a the wearer" with -- require the use of the wearer --;

Column 5,
Line 47, replace "CPU;50" with -- CPU 50 --;

Column 10,
Line 9, replace "preciously" with -- precisely --;

Column 13,
Line 34, replace "CTLR1CO2CHO1" with -- CTLR1C02CH01 --;

Column 17,

Signed and Sealed this

Twenty-sixth Day of July, 2005

JON W. DUDAS
*Director of the United States Patent and Trademark Office*

UNITED STATES PATENT AND TRADEMARK OFFICE
CERTIFICATE OF CORRECTION

PATENT NO.    : 6,806,847 B2
DATED         : October 19, 2004
INVENTOR(S)   : Mark J. Nixon et al.

It is certified that error appears in the above-identified patent and that said Letters Patent is hereby corrected as shown below:

Title page,
Item [56], References Cited, insert the following:
-- OTHER PUBLICATIONS
Bauer et al., "A Collaborative Wearable System with Remote Sensing," *IEEE paper presented at International Symposium on Wearable Computers*, Pittsburgh, Pennsylvania, pp.10-17, (October 1998).

Rekimoto et al., "Augment-able Reality: Situated Communication through Physical and Digital Spaces," *IEEE paper presented at International Symposium on Wearable Computers*, Pittsburgh, Pennsylvania, pp. 68-75, (October 1998).

"Hats On For Process Control," *Control*, p. 28 (November 1997). --.

Column 2,
Line 55, replace "require the use of a the wearer" with -- require the use of the wearer --;

Column 5,
Line 47, replace "CPU;50" with -- CPU 50 --;

Column 10,
Line 9, replace "preciously" with -- precisely --;

Column 13,
Line 34, replace "CTLR1CO2CHO1" with -- CTLR1C02CH01 --;

UNITED STATES PATENT AND TRADEMARK OFFICE
CERTIFICATE OF CORRECTION

PATENT NO.    : 6,806,847 B2
DATED         : October 19, 2004
INVENTOR(S)   : Mark J. Nixon et al.

It is certified that error appears in the above-identified patent and that said Letters Patent is hereby corrected as shown below:

<u>Column 17,</u>
Lines 10 and 53, replace "modem" with -- modern --.

This certificate supersedes Certificate of Correction issued July 26, 2005.

Signed and Sealed this

Thirteenth Day of December, 2005

JON W. DUDAS
*Director of the United States Patent and Trademark Office*